Feb. 6, 1934.   M. MATTSON   1,946,225
TRACTOR GUIDE
Original Filed May 9, 1930   2 Sheets-Sheet 1
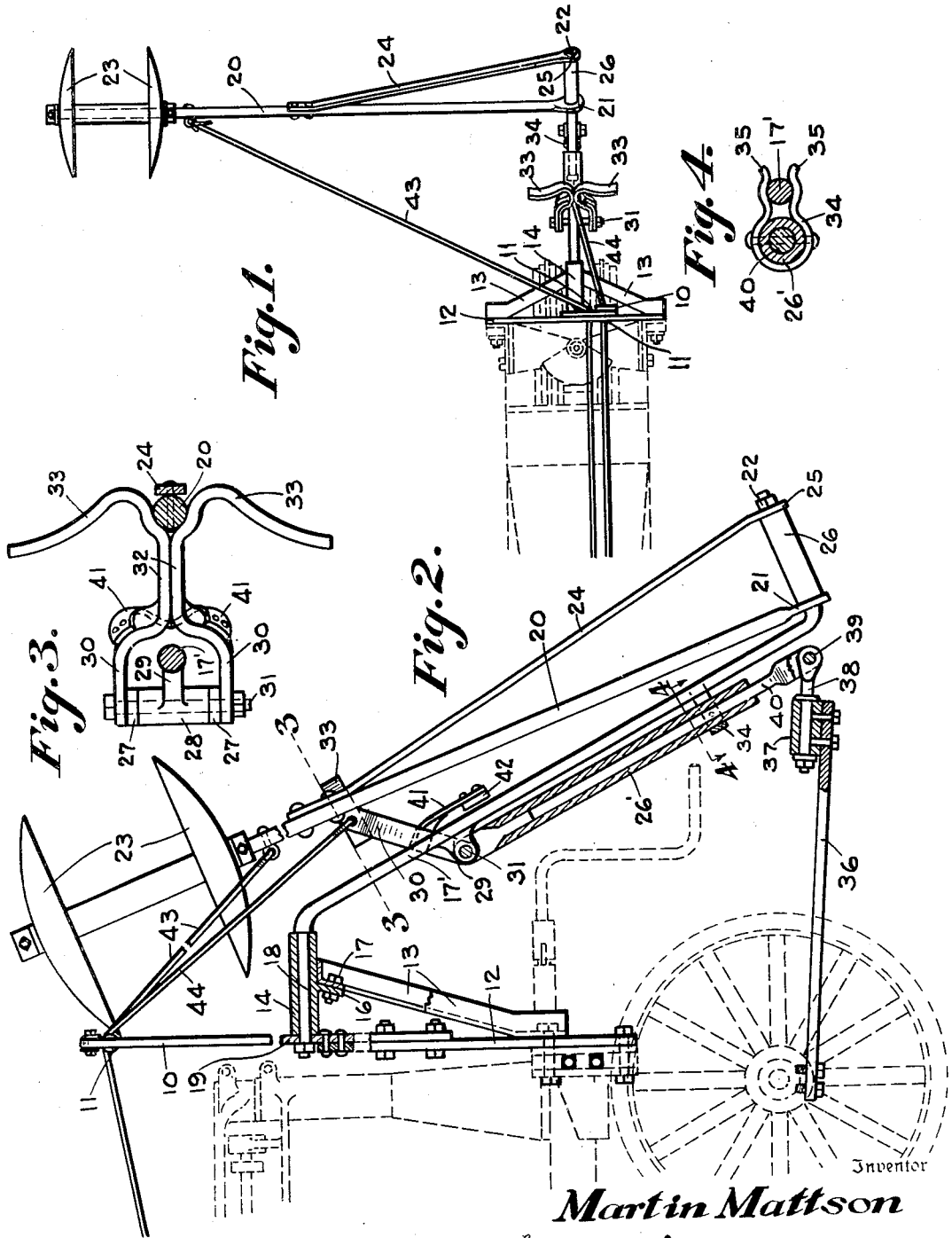
Inventor
Martin Mattson
By Hiram A. Sturges
Attorney

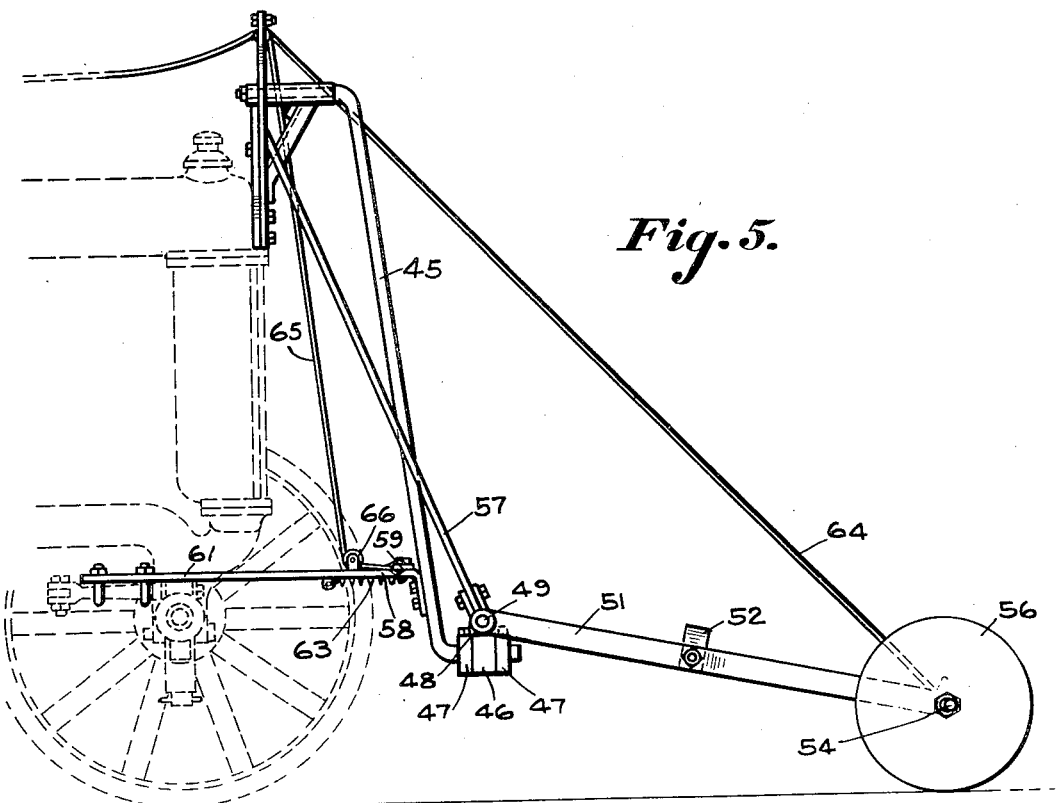
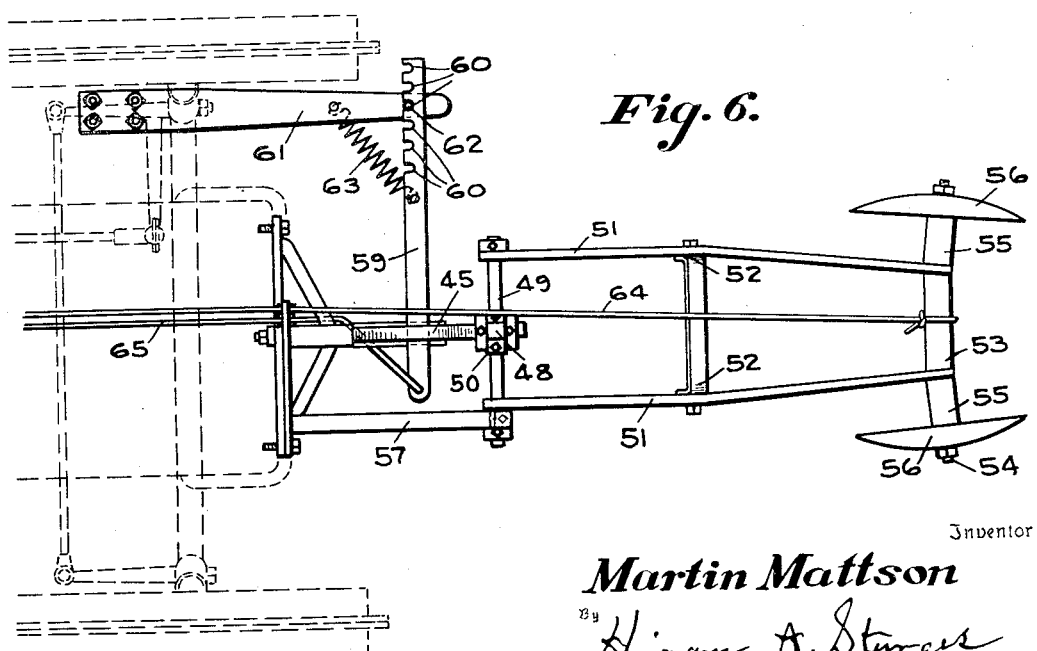

Patented Feb. 6, 1934

1,946,225

UNITED STATES PATENT OFFICE 1,946,225

TRACTOR GUIDE

Martin Mattson, Loomis, Nebr.

Original application May 9, 1930, Serial No. 451,131. Divided and this application January 12, 1931. Serial No. 508,144

22 Claims. (Cl. 97—49)

This invention relates to an improvement in tractor guides. The present application has for its object to divide the patent application Serial No. 451,131 filed May 9, 1930. The application thus filed, by inadvertence, included two inventions, and in order that both inventions may be separately described and claimed, this division is now made.

This invention relates to new and useful improvements in steering guides for tractors and other implements whereby the furrows and hills in cultivated ground will be formed and maintained equal distances apart.

One of the principal objects of the invention consists of a support for the guide and from which the guide may be swung to either side of the implement.

Another object of the invention consists of means for the establishment of connection between the support and steering mechanism for the implement proper whereby corresponding motion may be transmitted to the guide to follow therewith.

Another of the major characteristics of the invention embodies the arrangement of a form of connection between the support and the steering wheels of the implement whereby binding action will be relieved at this point as the steering wheels and guides are shifted laterally of the implement proper.

With the above and other objects in view, the invention further consists of the following novel features and details of construction, to be hereinafter more fully described, illustrated in the accompanying drawings and pointed out in the appended claims.

In the drawings:

Fig. 1 is a fragmentary top plan view of a form of tractor showing my improved form of guide extended laterally thereof for disposition within a furrow.

Figure 2 is a side elevation of the guide in retracted position and partly in section.

Figure 3 is a sectional view taken on line 3—3 of Figure 2.

Figure 4 is a sectional view taken on line 4—4 of Figure 2.

Figure 5 is a side elevation of a modified form of the invention as applied and extended from a different make of tractor.

Figure 6 is a top plan view of the modified form of guide when extended for use.

Referring to the drawings in detail wherein like characters of reference denote corresponding parts, the reference character 10 indicates generally a supporting arm having the uppermost end thereof inwardly and upwardly inclined to suspend therefrom a double pulley 11. A frame structure 12, carried by the tractor chassis and upon which the arm 10 is mounted, is provided with upwardly and inwardly inclined brace arms 13. A bearing sleeve 14 having a depending apertured ear 16 accommodates a form of fastening 17 which is also passed through the immediate portions of the brace arms 13. A supporting bar 17' downwardly, forwardly and obliquely inclined in advance of the tractor is provided with a horizontally disposed offset innermost end 18 journalled within the bore of the sleeve 14. The extreme end of the offset portion being tapped to accommodate a nut or other fastening located upon the opposite side of an apertured plate 19 carried upon the uppermost and intermediate portion of the frame structure 12 in the manner suggested in Figure 2 of the drawings. A guide bar 20 having an enlarged apertured portion 21 upon one end to accommodate the upwardly and obliquely inclined lowermost end 22 of the supporting bar 17' carries spaced oppositely disposed colters 23 adjacent its opposite end. These colters are designed for disposition within adjacent furrows and to span the immediate hill formed therebetween. In the appended claims the colters are designated by the word guide.

A brace bar 24 having an enlarged and apertured portion 25 upon its lowermost end to accommodate the outermost end of the upwardly and obliquely disposed extremity 22 of the bar 17' is rigidly secured at its opposite end to the bar 20. A spacing sleeve 26 carried upon the upwardly and obliquely inclined end 22 of the bar 17' is interposed between the enlarged and apertured ends 21 and 25 of the bar 20 and brace bar 24 respectively.

A sleeve member 26' formed with spaced aligned apertured ears 27 upon its uppermost end to accommodate a sleeve bearing 28 therebetween is connected with the bar 17' through the employment of an extension 29 carried upon the sleeve bearing 28. Yoke arms 30 arranged in the manner suggested in Figure 3 of the drawings are aligned upon the outer sides of the ears 27 to accommodate a pivot bolt 31 passed through the entire assemblage. The yoke arms 30 are brought together forwardly and in advance of the bar 17', as at 32, and subsequently distorted to provide horn like spring like retaining arms 33. As will be noted from the Figure 3 illustration, the bar 20 is designed for accommodation between the innermost portions of the arms 33 when swung from either side of the tractor.

A clamping element 34 carried by the sleeve 26' terminates to provide spring fingers 35 to position the bar 17' therebetween.

Numeral 36 indicates a steering-arm which is rigidly mounted upon and which projects forwardly from the axle of the tractor, said axle and tractor being of the laterally shifting type. Said plate or steering-arm 36 carries a horizontally disposed bearing sleeve 37 upon its upper side adjacent the forward end thereof. A stub shaft 38 journalled within the bore of the sleeve 37 is pivoted as at 39 to the lowermost end of a shaft 40 telescopically associated with the sleeve 26'.

Brace arms 41 carried by the yoke arms 30 are downwardly and inwardly projected for rigid connection with the connecting plate 42 whereby the yoke arms 30 and retaining arms 33 will be maintained in position for use.

Ropes or other pulleys 43 and 44 respectively, passed over the wheels of the double pulley and within convenient reach of the tractor operator, are connected at their opposite ends with the bar 20 and the yoke arms 30 whereby the latter may be released and lowered, as the case may be, when the bar 20 is to be operated from the tractor driver's seat. In case the operator was upon the ground and desired to sustain the bar 20 in the Figure 3 position, he could effect such operation merely by swinging the bar 20 hard enough against either of the spring arms 33 to deflect same out of the path of movement of said bar.

As shown in the Figure 1 illustration, the steering wheels of the form of tractor to which the invention is applied are disposed in close proximity and the plate member 36 is designed for synchronous lateral shifting and turning movement therewith.

The connections between the sleeve 26 and the bar 17' will cause the two elements to shift simultaneously to one side or the other in conjunction with the wheels of the tractor due to the fact that the offset end 18 of the bar 17' will rock within the bore of the sleeve 14. The shaft 40 telescopically associated with the sleeve 26 and pivotally connected, as at 39, with the stub shaft 38, will be laterally shifted and reciprocated within the bore of the sleeve 26 as the connection is lengthened and shortened, that is, when the wheels are shifted in one direction or the other from the normal forwardly projecting position of the bar 17'. The converse of the aforementioned action will occur when the colters 23 are in use, that is, any deviation in the direction of the furrows will transmit like movement to the steering wheels of the tractor.

It is to be noted that the improved form of guide will not only prove effective in the alleviating of constant strain on the steering wheel by the tractor operator to maintain the tractor in a true course but which will also allow the operator to release the steering wheel so that the necessary adjustments may be effected with relation to the implements being towed while the tractor is in transit.

In Figures 5 and 6 of the drawings I have illustrated a modified form of guide construction to be employed upon tractors having steering mechanisms closely resembling those employed upon the modern types of motor vehicles. The modification embodies a rod or supporting-bar 45 corresponding in shape to and mounted after the manner of the rod or supporting-bar 17' employed in the other form of the invention. A sleeve 46 carried upon the lowermost outwardly and forwardly projecting offset end of the supporting-bar 45 and retained against undue rectilinear motion thereon incident to the employment of stop collars 47 disposed adjacent the ends thereof, supports a bearing sleeve 48 upon the upper side thereof having the bore right-angularly disposed with relation to the bore of the sleeve 46. A cross bar 49 passed through the bore of the sleeve 48 and retained against longitudinal shifting movement therethrough by stop collars 50 has connection adjacent the extremities thereof with a frame-guide including arms 51. The latter mentioned arms are constantly maintained in spaced relation by a spreader bar 52 located at an appropriate point in the lengths thereof and spaced from the ends whereas the outermost projecting ends are held spaced apart by a bearing sleeve 53 receiving a shaft 54 through the bore thereof. Those portions of the shaft 54 outwardly projecting from the arms 51 are slightly forwardly offset to accommodate spacing sleeves 55 and oppositely disposed guides or colters 56 in towed-in relation whereby the colters will hug to the hill spanned by the sleeve 53 and shaft 54.

A brace member 57 establishes connection at the respective ends thereof with the supporting structure for the uppermost end of the supporting-bar 45 and the shaft 49 to constantly maintain the latter in a horizontal plane.

An attaching plate or bracket 58 carried by and horizontally projecting with relation to the supporting-bar 45 has pivotally and eccentrically associated therewith an adjusting-bar 59 provided with a multiplicity of spaced cut-out portions 60. A plate member or steering-arm 61 carried by, rigidly secured to and forwardly projecting from one of the spindle arms of the tractor steering apparatus and projecting beneath the under side of the adjusting-bar 59 to provide a support therefor, carries an upstanding projection 62 designed for selective accommodation within any one of the plurality of cut-out portions 60 in the adjusting plate 59. A retractile spring 63 having connection at its ends with the adjusting-bar 59 and plate member 61 spaced from the projection and cut-out portion connection yieldingly induces the projection within the immediate cut-out portion. A pull rope 64 is provided for the purpose of elevating the guide by swinging the arms 51 therefor upon the horizontally disposed shaft 49. A pull rope 65 passed over the other wheel of the double pulley wheel and beneath a single pulley wheel 66 mounted upon the bracket 58 has swivel connection with the shorter end of the adjusting plate 59. As shown in Figure 6 of the drawings, the modified form of guide is extended forwardly in advance and centrally of the longitudinal center of the tractor.

In the event the tractor is to be operated upon inclines, that is, sides of hills, etc., the lateral gravity shift of the tractor necessarily qualifies the effectiveness of the steering and in such cases the pull rope 65 is operated to release the adjusting-bar 59 from operative connection with the plate member 61. The steering wheels for the tractor are then turned in a direction whereby the tractor would have a tendency to gradually move down hill. The pull rope 65 is then released so that the projection 62 will be disposed in the next succeeding of the cut-out portions 60 in the adjusting-bar 59. The wheels are then straightened and the colters 56 are shifted slightly up hill whereby the furrows on the hillside will be maintained and followed in parallelism. The cut-out portions 60 are arranged in such manner and in number whereby adjustments of the character described may be effected in either direction.

It is to be noted that in both forms of my invention, that is, the laterally projecting and forwardly disposed guide apparatus, the result is the same, that is, deviation of the furrows in either direction will have the corresponding motion transmitted to the steering wheels of the tractor through the colter guide apparatus whereby the hills and furrows will be maintained equal distances apart.

The invention is susceptible of various changes in its form, proportions and minor details of construction, and the right is herein reserved to make such changes as properly fall within the scope of the appended claims.

I claim as my invention,—

1. In a guide for a tractor having front wheels arranged to swing upon and transversely of an axle and provided with steering mechanism, a steering-arm mounted on said steering mechanism and projecting forwardly of the axle, an upright supporting-bar mounted at its upper end on the tractor to permit swinging movements thereof transversely of the line of travel of said tractor, an adjusting-bar mounted on the steering arm and connected with the supporting-bar, a guide-bar pivotally mounted on the lower end of the supporting bar and having a guide adapted to travel in a furrow for moving the guide-bar, said supporting-bar and steering mechanism of the tractor.

2. In a guide for a tractor having front wheels arranged to swing upon and transversely of an axle and provided with steering mechanism, a steering-arm mounted on the steering mechanism of the tractor, an upright supporting-bar having a horizontal part at its upper end pivotally mounted on the tractor and having a horizontal part at its lower end, an adjusting-bar mounted on the steering-arm and connected with the supporting-bar, a guide-bar pivotally mounted on the lower horizontal part of the supporting-bar and having a guide adapted to move in a furrow for moving the guide-bar, said supporting-bar and steering mechanism of the tractor.

3. In a guide for a tractor having front wheels mounted upon and arranged to swing transversely of an axle and provided with steering mechanism, a steering-arm mounted upon said steering mechanism and projecting forwardly of the axle, an upright frame mounted on the front of the tractor, an upright supporting-bar having a horizontal end-portion pivotally mounted on said frame, an adjusting-bar pivotally mounted at its respective ends upon the supporting-bar and steering-arm, a guide-bar having a pivotal connection with the lower end of the supporting-bar and having a guide adapted to travel in a furrow for moving the guide-bar, said supporting-bar, said adjusting-bar and steering mechanism.

4. In a guide for a tractor having front wheels mounted on an axle to permit swinging movements transversely thereof and provided with steering devices, a steering-arm mounted on said steering devices and projecting forwardly of the axle, an upright supporting-bar having a horizontal extension at its upper end pivotally mounted on the tractor and having a horizontal extension at its lower end, an adjusting-bar having a connection with the supporting-bar between the horizontal extensions thereof and mounted on the steering-arm, a guide-bar pivotally mounted on the lower horizontal extension of the supporting-bar and having a guide adapted to travel in a furrow for actuating the guide-bar, said supporting-bar and the steering devices of said tractor.

5. In a guide for a tractor having front wheels mounted on an axle to permit swinging movements transversely thereof and provided with steering devices, an upright supporting-bar having a horizontal part at its upper end pivotally mounted on the tractor and connected with the steering devices of the tractor, a guide-bar pivotally mounted on the lower end of the supporting-bar and having a guide adapted to travel in a furrow for actuating said guide-bar, said supporting-bar and steering devices of said tractor.

6. In a guide for a tractor having front wheels arranged to swing upon and transversely of an axle and provided with steering mechanism, a steering-arm connected with said steering mechanism, an upright supporting-bar pivotally mounted at its upper end upon the tractor and having a horizontal extension for its lower end, a spring-controlled adjusting-bar mounted on the supporting-bar and having a pivotal connection with said steering-arm, a guide-bar pivotally mounted on the lower horizontal extension of the supporting-bar and having a guide adapted to travel in a furrow for actuating the guide-bar, said supporting-bar, the spring-controlled adjusting-bar and said steering mechanism.

7. In a guide for a tractor having front wheels mounted on an axle to permit swinging movements transversely thereof and provided with steering devices, a steering-arm mounted on said steering devices and extending forwardly of the axle, a frame carried by the tractor and provided with a strand-holder, an upright supporting-bar having a horizontal part at its upper end pivotally mounted on said frame and provided with a horizontal part at its lower end, a spring-controlled adjusting-bar carried by the supporting-bar and connected with said steering-arm, a guide-bar mounted on a horizontal part of the supporting-bar to permit swinging movements thereof in a circle's arc, said guide-bar having a guide adapted to travel in a furrow for moving the guide-bar, said supporting-bar and said steering devices, and a strand connected with said guide-bar and engaging the strand-holder for moving said guide-bar in a circle's arc.

8. In a guide for a tractor having front wheels mounted on an axle to permit swinging movements transversely thereof, and provided with steering-devices, a steering-arm mounted on the steering devices and projecting forwardly of the axle, an upright frame mounted on the tractor and provided with a strand-holder, an upright supporting-bar having a horizontal part at its upper end pivotally mounted on the frame and having a horizontal part at its lower end, a spring-controlled adjusting-bar mounted on the supporting-bar and connected with the steering-arm, a guide-bar mounted on the lower horizontal part of the supporting-bar to permit swinging movements therefrom and having a guide adapted to travel in a furrow for moving the guide-bar, the supporting-bar, the adjusting-bar and said steering devices, and a strand carried by said guide-bar and engaging the strand-holder for controlling the swinging movements of the guide-bar.

9. In a guide for a tractor having front wheels provided with steering devices and mounted on an axle to permit swinging movements transversely thereof, an upright supporting-bar connected with said steering devices and mounted at its upper end on the tractor to permit swinging movements transversely thereof and provided at its lower end with a horizontal extension, a guide-bar mounted on the horizontal extension of the supporting-bar to permit swinging movements therefrom, said guide-bar being provided with a guide adapted to travel in a furrow for moving the guide-bar, the supporting-bar and said steering devices, and a strand carried by the guide-bar for controlling the swinging movements thereof.

10. In a tractor guide for a tractor having front wheels arranged to swing on an axle for steering and provided with steering mechanism, an upright operating-bar mounted at its upper end on the tractor to permit swinging movements thereof transversely of the line of travel of said tractor, a steering-arm mounted on the steering mechanism of the tractor, an adjusting-bar mounted on the seering-arm and connected with the operating-bar, a guide-bar pivotally mounted on the lower end of the operating-bar and having a guide adapted to travel in a furrow for moving the guide-bar, said operating-bar and steering mechanism of the tractor.

11. In a tractor guide for a tractor having front wheels arranged to swing on an axle for steering and provided with steering mechanism, an upright operating-bar having a horizontal part at its upper end pivotally mounted on the tractor and having a horizontal part at its lower end, a forwardly projecting steering-arm mounted on the steering mechanism of the tractor, an adjusting-bar mounted on the steering-arm and connected with the operating-bar, a guide-bar pivotally mounted on the lower horizontal part of the operating-bar and having a guide adapted to move in a furrow for moving the guide-bar, said operating-bar and steering mechanism of the tractor.

12. In a tractor guide for a tractor having front wheels arranged to swing on an axle for steering and provided with steering mechanism, an upright frame mounted on the front of the tractor, an upright operating-bar having a horizontal end-portion pivotally mounted on said frame, a steering-arm mounted on the steering mechanism and projecting forwardly of the tractor, an adjusting-bar pivotally connected at its respective ends with the steering-arm and operating-bar, a guide-bar having a pivotal connection with the lower end of the operating-bar and having a guide adapted to travel in a furrow for moving the guide-bar, said operating-bar, said adjusting-bar and steering mechanism of the tractor.

13. In a guide for a tractor having front wheels arranged to swing horizontally from an axle and provided with steering mechanism, a steering-arm projecting forwardly of the axle and connected with said steering mechanism, a frame on the body of the tractor, a horizontal sleeve disposed longitudinally of the tractor and rigidly mounted on the frame, an upright supporting-bar having a horizontal upper end-portion engaging in the sleeve, an adjusting-bar mounted on the supporting-bar and connected with the steering-arm, an elongated guide-member mounted to swing from the lower end of the supporting-bar and having a guide for moving in a furrow to cause movements of the supporting-bar, adjusting-bar and steering-arm.

14. In a guide for a tractor having front wheels arranged to swing horizontally from the ends of an axle and provided with steering mechanism, a steering-arm projecting forwardly of the axle and connected with said steering mechanism, a frame mounted on the body of the tractor, an upright supporting-bar having a rearwardly projecting part at its upper end mounted on said frame to swing around a horizontal axis, an adjusting-bar mounted on the supporting-bar and connected with the steering-arm, an elongated guide-member pivotally mounted on the lower end of the supporting-bar and having a guide adapted to travel in a furrow for moving said guide-member, said supporting-bar, said adjusting-bar and said steering-arm.

15. In a guide for a tractor having front wheels arranged to swing horizontally from an axle and provided with steering mechanism, an upright supporting-bar having a horizontal upper end-portion mounted on the tractor to permit swinging movements thereof about a horizontal axis, a steering-arm mounted on said steering mechanism, an adjusting-bar mounted on the supporting-bar and connected with the steering-arm, an elongated guide-member mounted on the lower end of the supporting-bar and having a guide adapted to move in a furrow for moving the guide-member, the supporting-bar, the adjusting-bar and said steering-arm.

16. In a guide for a tractor having wheels arranged to swing horizontally from the ends of an axle and provided with steering mechanism, a steering-arm mounted on said steering mechanism and projecting forwardly of the axle, a frame mounted on the body of the tractor and projecting upwardly therefrom, an upright supporting-bar having a rearwardly bent upper end-portion and forwardly bent lower end-portion and disposed at the front of the tractor with its upper rearwardly bent end-portion parallel with the longitudinal axis of the tractor and journalled on said frame, an adjusting-bar mounted on the supporting-bar and connected with the steering-arm and an elongated guide-member mounted on the forwardly bent lower end-portion of the supporting-bar and having a guide adapted to move in a furrow for moving said guide-member, the supporting-bar, the adjusting-bar and said steering-arm.

17. In a guide for a tractor having wheels arranged to swing horizontally from the ends of an axle and provided with steering mechanism, a sleeve rigidly mounted upon and disposed approximately parallel with the longitudinal axis of the tractor, an upright supporting-bar at the front of the tractor having a rearwardly projecting upper end-portion journalled in the sleeve, an adjusting-bar mounted on the supporting-bar and connected with the steering-arm, and a guide-member mounted on the lower end of the supporting-bar having a guide adapted to move in a furrow for moving said supporting-bar, said adjusting-bar and said steering-arm.

18. In a guide for a tractor having wheels arranged to swing horizontally from an axle and provided with steering mechanism, a steering-arm mounted on said steering mechanism, an upright supporting-bar having approximately horizontal end-portions and having a mounting of its upper horizontal end-portion on the tractor to permit swinging movements thereof around a horizontal axis, an adjusting-bar mounted on the supporting-bar and connected with the steering-arm, an elongated guide-member pivotally mounted on the lower end-portion of the supporting-bar and provided with a ground-engaging guide adapted to be moved for moving the supporting-bar, the adjusting-bar and said steering-arm.

19. In a guide for a tractor having wheels arranged to swing horizontally from the ends of an axle and provided with steering-devices, a steering-arm mounted on said steering devices, an upright supporting-bar connected with the steering-arm and having a rearwardly projecting part at its upper end mounted on the tractor to permit swinging movements around a horizontal axis, and a guide-member mounted to swing from the lower end of the supporting-bar and having a guide adapted to move in a furrow for moving the supporting-bar and said steering-arm.

20. In a guide for a tractor having front wheels arranged to swing horizontally from an axle and provided with steering devices, a steering-arm mounted on said steering devices, an upright frame mounted on the body of the tractor, an upright supporting-bar connected with said steering-arm and having a rearwardly projecting part at its upper end journalled on the frame to permit it to rotate about a horizontal axis and to permit its lower end to have swinging movements at right-angles to the longitudinal axis of the tractor, a guide-member mounted to swing from the lower end of the supporting-bar and having a guide adapted to travel in a furrow for moving the supporting-bar and said steering-arm.

21. In a guide for a tractor having wheels arranged to swing horizontally from the ends of an axle and provided with steering devices, a steering-arm mounted on said steering devices, a frame mounted on the body of the tractor and provided with a bearing, an upright supporting-bar connected with said steering-arm and having a rearwardly projecting horizontal part at its upper end journalled in said bearing, a guide-member mounted to swing from the lower end of the supporting-bar and having a guide adapted to move in a furrow for moving the supporting-bar and said steering-arm.

22. In a guide for a tractor having front wheels arranged to have horizontal swinging movements from the ends of an axle and provided with steering devices, a steering-arm mounted on said steering devices, a frame mounted on the tractor and provided with a horizontally disposed bearing, an upright supporting-bar having a forwardly projecting part at its lower end and having a rearwardly projecting horizontal part at its upper end journalled in the bearing of said frame to permit swinging movements of the lower end of said supporting-bar at right-angles to the longitudinal axis of the tractor, an adjusting-bar mounted on the supporting-bar and connected with the steering-arm, a guide-member mounted to swing from the forwardly projecting part of the supporting-bar and having a guide adapted to travel in a furrow for moving the guide-member, said supporting-bar, said adjusting-bar and said steering-arm.

MARTIN MATTSON.